United States Patent [19]

Groves

[11] Patent Number: 5,033,429

[45] Date of Patent: Jul. 23, 1991

[54] INTERNAL COMBUSTION ENGINE

[76] Inventor: James L. Groves, 2350 E Rd., Grand Junction, Colo. 81503

[21] Appl. No.: 463,599

[22] Filed: Jan. 11, 1990

[51] Int. Cl.⁵ .............................................. F02B 53/00
[52] U.S. Cl. ..................................... 123/200; 123/241
[58] Field of Search ................................. 123/200, 241

[56] References Cited

U.S. PATENT DOCUMENTS

| | | | |
|---|---|---|---|
| 2,816,527 | 12/1957 | Palazzo | 123/11 |
| 3,594,104 | 7/1971 | Speese | 418/6 |
| 3,871,337 | 3/1975 | Green | 123/8.47 |
| 3,895,893 | 7/1975 | Sommer | 418/153 |
| 3,902,465 | 9/1975 | Stookey | 123/8.17 |
| 4,599,976 | 7/1986 | Meuret | 123/18 A |

Primary Examiner—Leonard E. Smith
Assistant Examiner—David L. Cavanaugh
Attorney, Agent, or Firm—John E. Reilly

[57] ABSTRACT

An internal combustion engine having a pair of stationary housings of generally triangular configuration with sidewalls of each housing converging into one end of the opposite ends of a common output shaft, a compression chamber being disposed in each sidewall of a housing at the intersection of adjacent sidewalls; and a plurality of elongated connecting rods are mounted in each housing for rotation about a common axis of rotation, the rods disposed at pretermined angles to one another and each rod having a vane at an outer free end, the movement of one of the connecting rods parallel to one of the sidewalls in each housing causing rotation of the vane on another of the connecting rods into one of the compression chambers whereupon ignition of a fuel/air mixture in that chamber will impart movement of the other rod toward the next chamber in succession as it rotates the vane on the one rod through another chamber, and the successive, alternate firing of compression chambers in each housing causing rotation of the common output shaft to derive useful work.

11 Claims, 3 Drawing Sheets

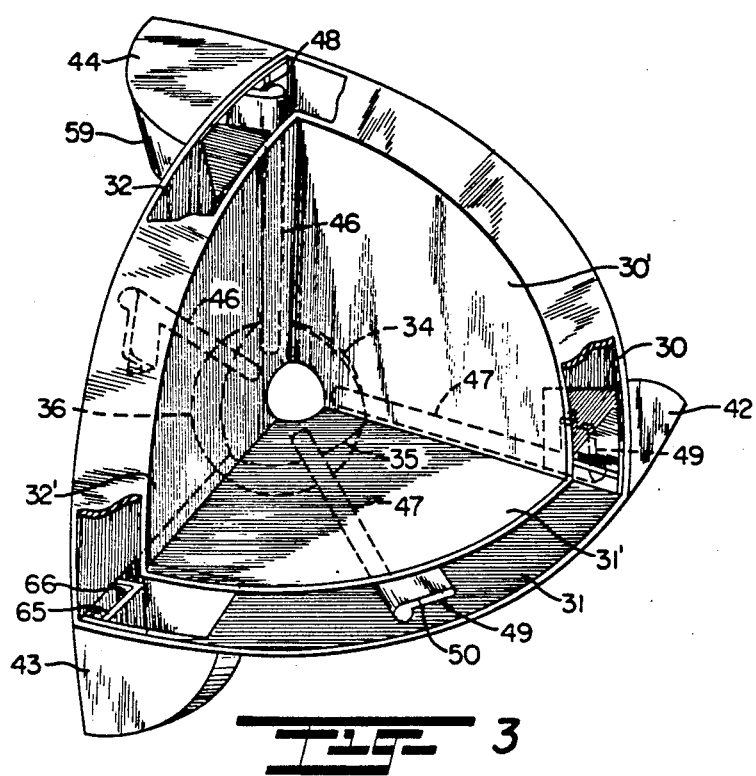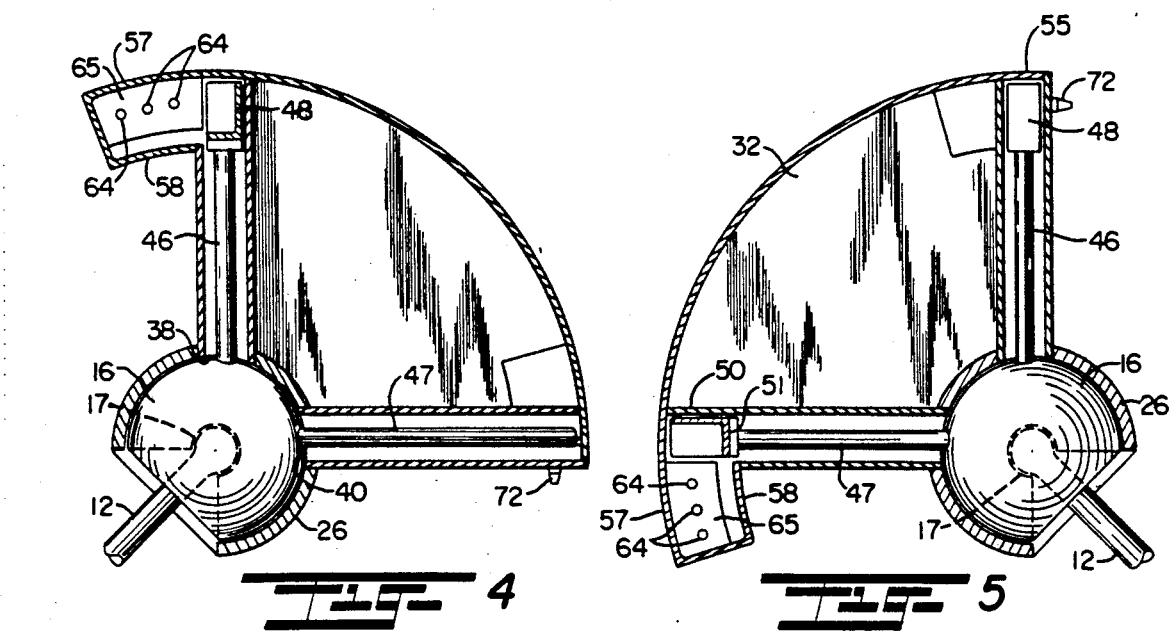

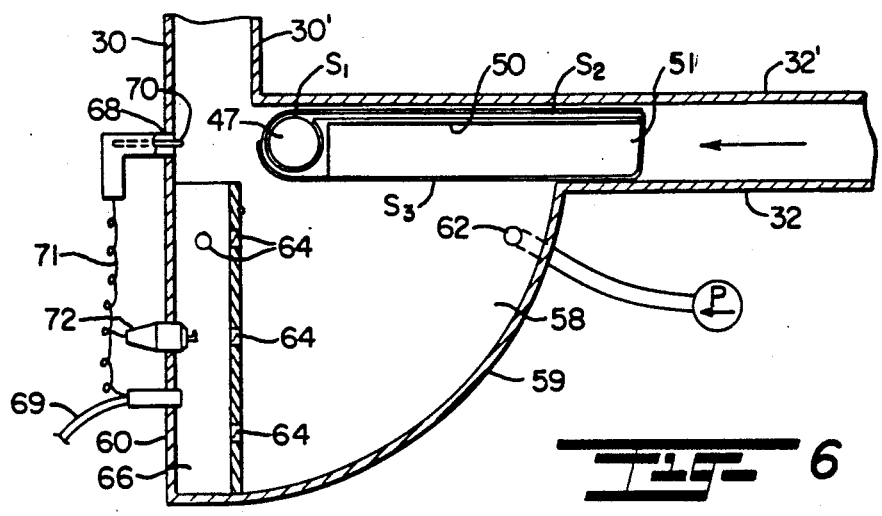
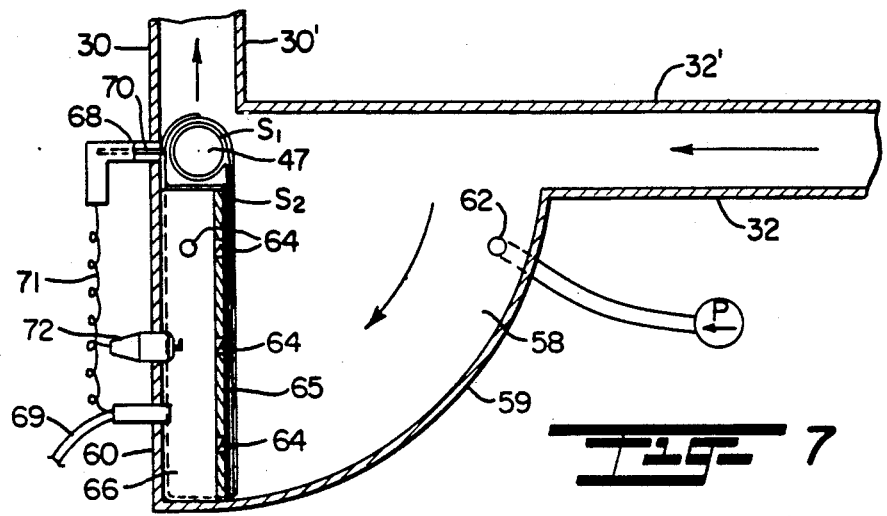
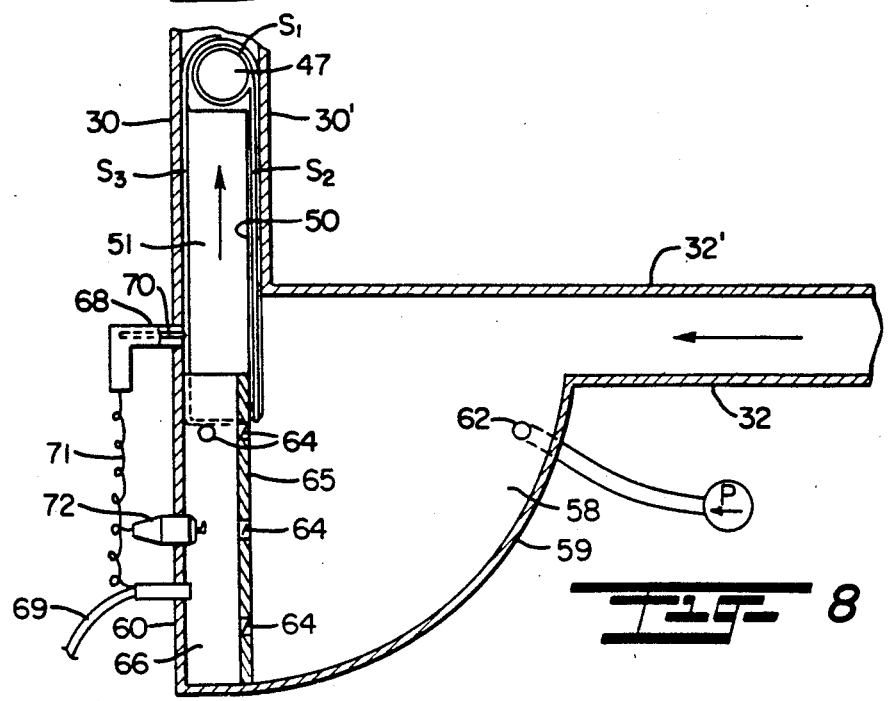

INTERNAL COMBUSTION ENGINE

This invention relates to a motive source of power; and more particularly relates to a novel and improved internal combustion engine of the rotary type.

BACKGROUND AND FIELD OF THE INVENTION

Various types of rotary engines and pumps have been devised in the past which utilize the turning motion of a series of vanes within compression chambers to generate power. Representative of such approaches is the rotary piston pump disclosed in U.S. Pat. No. 3,895,893 to M. Sommer wherein generally disk-shaped vanes are mounted on shafts to undergo movement through an annular chamber having a pumping area of generally circular cross-section. The vanes are free to turn about radial axes perpendicular to their direction of movement while advancing through one portion of the chamber and also can turn approximately 90° to advance through another portion of the chamber. U.S. Pat. No. 4,599,976 to P. V. Meuret typifies another approach in which a rotary piston is in the shape of a semi-circular vane on a rotating shaft. Similar approaches are disclosed in other U.S. Pat. No. including U.S. Pat. No. 2,816,527 to Q. Palazzo, No. 3,871,337 to E. H. Green et al and No. 3,594,104 to J. Speese. None, however, utilizes the rotational movement of a lever arm about a center axis to cause turning or rotational movement of a vane-type piston about another lever arm and in such a way as to rotate the piston through a compression chamber to compress a gas as a preliminary to ignition or firing; further wherein the firing in each chamber will impart translational movement to the associated vane-type piston and consequent turning or rotational movement of the vane-type piston on or about the first lever arm; and additionally to so arrange a series of vanetype pistons with respect to one or more compression chambers as to establish a multi-stroke engine capable of performing useful work in a dependable and efficient manner.

SUMMARY OF THE INVENTION

Accordingly, it is an object of the present invention to provide for a novel and improved motive power source which is capable of generating maximum power in relation to the size and amount of fuel or energy input; and further wherein the power source converts the rotary motion of a plurality of moment arms into useful work.

It is another object of the present invention to provide for a rotary type internal combustion engine which most effectively utilizes conventional intake, compression and ignition of fuel in a compression chamber into rotary motion of a series of vanes mounted for rotation about a common axis.

A further object and feature of the present invention is to utilize flat vane-type pistons mounted on respective moment arms extending radially from a common center to cooperate with a series of compression chambers whereby rotation of one moment arm about the common axis will cause the vane of another moment arm to create compression of air or other fluid in a compression chamber preliminary to ignition and firing in that chamber to impart rotation to its moment arm about the common axis; and further wherein matched pairs of vanetype pistons are capable of being utilized at opposite ends of a common shaft through the common axis of the moment arms to establish a closely coordinated combustion cycle and impart continued rotation to a common shaft between the combustion chambers.

In accordance with the present invention, another feature resides in a simple, compact engine design having maximum efficiency through utilization of an even number of vanes which are mounted for translational and rotational movement with respect to a combustion chamber. Specifically, each vane is mounted on a rod extending radially from a common axis, the rotational movement of one rod causing rotational movement of a vane about the other rod of a pair to advance through a compression chamber and cause compression of a gas as a preliminary to ignition. Ignition in each chamber will impart translation to the other rod of the pair which, as previously described, once again imparts turning or rotational movement to the vane of the first rod.

Still further in accordance with the present invention, the sidewalls of a combustion chamber or housing are odd-numbered and arranged in mutually perpendicular relationship to one another, and an odd number of individual compression chambers are receded into corners of the sidewalls so as to receive the turning vanes in sequential order. When the gas is compressed in each compression chamber by a turning vane, ignition can be triggered by translational movement of the shaft associated with the turning vane at the end of the stroke and which translational movement will in turn initiate turning movement of the other vane to cause compression of the gas in the next chamber.

Still another feature of the present invention resides in the cooperative disposition and arrangement of a pair of combustion chambers as described mounted about a common output shaft, the common axis of each set of rods or moment arms in each combustion chamber intersecting opposite ends of the common output shaft, and the vane-type pistons are offset in each combustion chamber to sequentially fire and advance in predetermined order through each chamber to impart rotary motion to the output shaft.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 3 is an enlarged perspective view of one of the combustion chambers of the preferred form of present invention;

FIG. 4 is a cross-sectional view through one of the combustion chambers as illustrated in FIG. 3;

FIG. 5 is another cross-sectional view taken through a combustion chamber as shown in FIG. 3; and FIGS. 6, 7 and 8 are enlarged cross-sectional views taken through one of the compression chambers of the preferred form of invention in which FIG. 6 illustrates a piston vane advancing toward alignment with the chamber, FIG. 7 shows the piston vane having advanced through the chamber into a fully compressed position, and FIG. 8 illustrates the movement of the piston vane away from the compression chamber following ignition.

DETAILED DESCRIPTION OF THE PREFERRED EMBODIMENT

Figure 1:
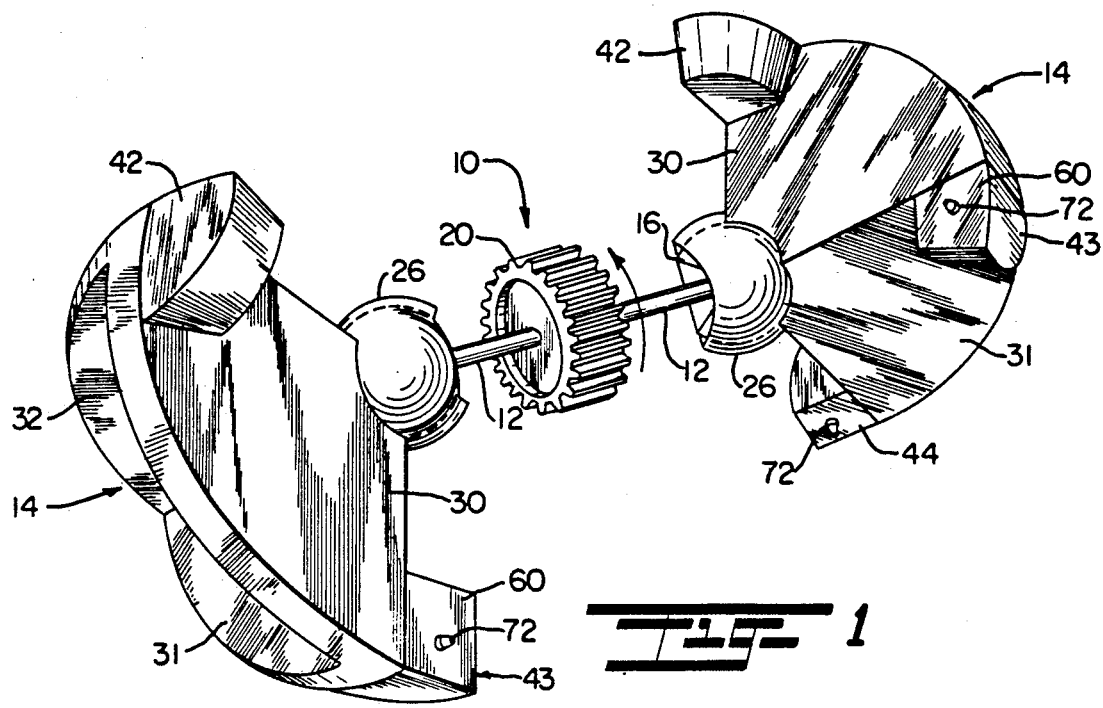
FIG. 1 is a somewhat perspective, schematic view of a preferred form of internal combustion engine in accordance with the present invention.
Figure 2:
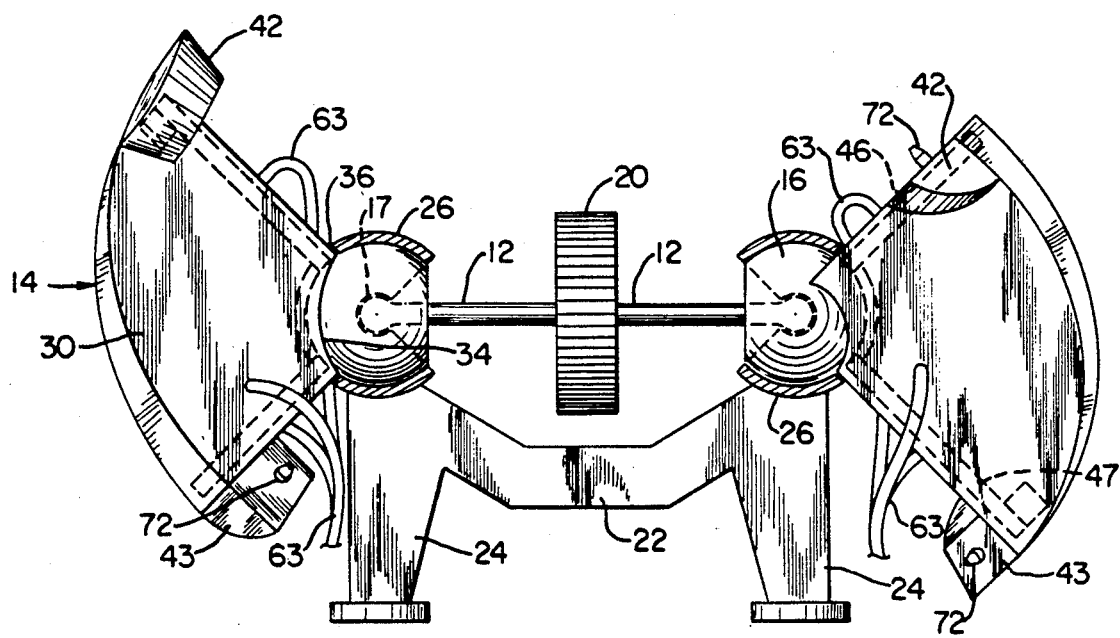
FIG. 2 is an elevational view partially in section of the preferred form of invention shown in FIG. 1.

Referring in more detail to the drawings, there is illustrated in FIGS. 1 and 2 a preferred form of internal combustion engine 10 having a common output shaft 12 extending between a pair of corresponding combustion chambers 14. The energy generated by each chamber or housing 14 is imparted through a spherical drive member 16 having a flexible coupling designated at 17 at each end of the common shaft 12. In a manner to be described, each chamber 14 is a mirror image of the other side; i.e., one side rotates in a counterclockwise direction while the other side rotates in a clockwise direction in imparting rotation to an output drive element which in the preferred form is illustrated as being in the form of a cog wheel 20 keyed for rotation to the shaft 12.

FIG. 2 illustrates the main encasement or housing 22 which encloses the output drive shaft 12 and cog wheel 20 and serves as a main support frame for the unit and, for the purpose of illustration, includes downwardly depending struts 24. Opposite ends of the encasement terminate in hollow arcuate bearings 26 in which the drive members 16 are journaled; and each of the main combustion housings 14 is permanently attached to and diverges away from one of the bearings 26. Broadly, each combustion housing 14 is comprised of three generally triangular sidewalls 30, 31 and 32 having inner, convergent edges 34, 35 and 36, respectively, of arcuate configuration and joined to edges of the bearing 26 which surround slotted portions 38, 39 and 40 in the bearing 26. Each sidewall 30, 31 and 32 includes an individual compression chamber 42, 43 and 44, respectively, at an outer peripheral corner of a sidewall and which is receded away from the plane of each respective sidewall. A pair of connecting rods 46 and 47 extend through the slotted portions 38'40 for connection to the drive sphere 16, the connecting rods 46 and 47 arranged at 90° to one another for outward radial extension in closely spaced parallel relation to the sidewalls 30-32. Each connecting rod terminates at its outer end in a vane-type piston 48 and 49, respectively, each piston extending at right angles to the longitudinal axis of its respective connecting rod. Each of the vanes 48 and 49 is of L-shaped cross-sectional configuration having a broad, flat radially extending surface portion 50 and a circumferentially extending portion 51 at a lower or inner radial edge of each surface portion 50.

In order to gain some appreciation of the coordinated translational and rotational movement between the connecting rods 46 and 47, when the connecting rod 46 is rotated about the drive member 16 from a position within the compression chamber 43 to a position aligned with the compression chamber 44, the drive member 16 will simultaneously rotate the connecting rod 47 about its longitudinal axis thereby causing rotation of the vane 49 through the compression chamber 42; and when the connecting rod 47 is ejected from the compression chamber 42 to move along the sidewall 31 toward the compression chamber 43, the connecting rod 46 will be rotated about its longitudinal axis to rotate the vane 48 through the compression chamber 44. In FIG. 3, the connecting rod 46 is shown in a first position advancing along and parallel to the sidewall 32 toward the compression chamber 44 with the vane 49 of the connecting rod 47 just beginning its rotational advancement through the compression chamber 42. Then as the connecting rod 47 is advanced along the sidewall 31 toward the compression chamber 43, the connecting rod 46 is shown undergoing rotation of its vane 48 through the compression chamber 44.

Each combustion housing 14 is illustrated as having inner spaced parallel sidewalls 30', 31' and 32' which are disposed in spaced parallel relation to the respective sidewalls 30, 31 and 32 so as to form channels through which the connecting rods 46 and 47 travel in advancing between the compression chambers. The inner walls 30', 31' and 32' have inner terminal edges which as shown are joined to edges of the bearing 16 on the opposite side of each channel 38, 39 and 40 to the outer sidewalls 30 to 32, respectively. In addition, the channels defined between the inner and outer sidewalls 30-30', 31-31' and 32-32' are closed by a roof or cover plate, for example, as illustrated at 55 in FIG. 5. As such, the inner sidewalls 30' to 32', inclusive, and the cover plates 55 complete the enclosure of the connecting rods and vanes in the combustion chamber 14.

Considering in more detail the construction and arrangement of the individual compression chambers 42 to 44, each generally takes the form of a quadrant of a circle and has a top wall 57, bottom wall 58, and a curved wall 59 merging into a rear wall 60 between the top and bottom walls 57 and 58. The rear wall 60 also forms a continuation of an associated sidewall 30 to 32; and the curved wall 59 is contoured to permit rotation of each vane 48 or 49 in snug-fitting engagement along the inner surface of that wall. Similarly, the outer radial edge of each vane surface 50 moves in close-fitting sealed relation to the inner surface of the top wall 57, and the inner radial portion 51 of each vane moves in close-fitting sealed relation to the bottom wall 58 of each chamber.

As shown in FIGS. 6 to 8, an air inlet port 62 is provided in the bottom wall 58 of each compression chamber for the continued introduction of fresh or outside air to be mixed with fuel, in a manner to be described, and to clear the chamber of exhaust gases between each firing. The inlet port 62 is located relatively near the entrance to each chamber and, as shown in FIGS. 6 and 7, as the vane surface is caused to rotate through the compression chamber and passes the inlet port 62, it will compress the air in the chamber and force it through check valves 64 in a baffle plate 65 disposed in closely spaced parallel relation to the rear wall 60, and a bottom wall 66. The baffle plate 65 together with the bottom wall 66 between the baffle plate 65 and rear wall 60 forms a separate compartment or subchamber with the top wall 57 in each compression chamber for ignition of a fuel/air mixture. Initially, as the air is pumped through the air inlet valve 62, it will clear out any exhaust gases remaining in the compartments from the previous ignition, and these gases may be suitably vented to the atmosphere from the interior of each housing 14 via separate exhaust lines 63 in communication with the channels 30—30', 31—31' and 32—32', as shown in FIG. 2. However, as the outer radial end of a connecting rod, such as, the connecting rod 47 shown in FIGS. 6 to 8 approaches the end of its travel and moves into engagement with the rear wall 60, any remaining air in the compartment will be compressed. Thus, in the position of peak compression as illustrated in FIG. 7, the air which has been compressed into the baffle chamber as described is free to expand only by urging the end of the connecting rod 47 in a direction parallel to the sidewall, such as, the sidewall 30. Initial expansion or movement of the rod 47 and its vane away from the chamber and in the direction of the arrows is shown in FIGS. 7 and 8. After moving but a slight distance, the end of the rod 47 will have moved past a port 68 and away from engagement with a pressure sensitive element 70 in the port to trigger a firing circuit represented at 71. Sequentially, the firing circuit will open a fuel injection line 69 for injection of fuel into the subchamber and activate the spark plug 72 to cause ignition of the fuel/air mixture within the subchamber. It will be apparent that the fuel injection port or line 69 can be opened independently in response to a certain level of pressure developed within the subchamber independently of the firing circuit 71 so that the firing circuit can be employed solely to energize the spark plug 72 when the rod 47 clears the port 68. The consequent expansion of the gases within the baffle chamber will greatly accelerate the movement of the connecting rod 47 along the sidewall 30 toward the next compression chamber thereby imparting rotation to the vane 48 about the axis of its connecting rod 46 to compress the air in the next chamber preliminary to ignition in that chamber.

The combustion housing 14 is so arranged at opposite ends of the common output shaft 12 as to alternate the firing in each compression chamber 42 to 44 between each housing. As stated earlier, the connecting rods 46 and 47 in one housing are rotated in a direction opposite to that of the connecting rods 46, 47 in the other housing to cause the shaft 12 to rotate in one direction; and alternate firing of successive chambers 42 to 44 on each side of the housings at equally spaced intervals will result in smoother engine operation and improved engine balance.

For the purpose of illustration but not limitation, sealing portions are designated, for example, at $S_1$ and $S_2$ along the outer radial edges of the rod 47 and vane surface 50. Another sealing surface or portion $S_3$ extends along the inner radial edge of the wall 51 for maximum efficiency during compression and expansion of the gases within each chamber. In addition, suitable bearing or sealing surfaces are formed along the interfaces between the connecting rods 46, 47 and interior and exterior sidewalls 30'-32' and 30—32 to minimize friction losses as each rod 46, 47 is advanced between chambers 42-44. The exhaust gases are released into the interior of the engine through the channels 38 to 40 between the sidewalls once the vane has exited the chamber and may be suitably vented to the atmosphere via emission control devices due to the fresh air being pumped into each of the three chambers on each side of the engine.

It will be evident that the relative size of the compression chambers 42-44 to the overall size of the combustion housing 14 may be varied according to intended application, size, performance or efficiency and power requirements. Moreover, although one combustion housing 14 has been characterized as a mirror image of the other, it is to be understood that each may be displaced at a selected angle with respect to the other housing to achieve optimum balance and smooth operation. As previously noted, it is desirable that the compression chambers 42 to 44 in each housing 14 be fired alternately and at equally spaced intervals to impart continuous rotation to the common output shaft 12. It will be appreciated that the relative number of connecting rods and pistons at each housing may be varied together with the number of sidewalls but generally will be necessary to provide a greater number of compression chambers and sidewalls than the number of vanes/connecting rods. It will be evident that the exhaust lines 63 as described may be connected at various different locations to remove the spent gases from the respective housings; also, that the exhaust lines may be connected into various emission control systems. Preferably, the flexible coupling 17 is a universal non-friction joint, for example, of the ball and socket variety which will most efficiently transmit rotation of the drive sphere into the common output shaft 12.

Accordingly, it is to be understood from the foregoing that while a preferred embodiment of the present invention is herein set forth and described, various modifications and changes may be made without departing from the spirit and scope of the present invention as defined by the appended claims and reasonable equivalents thereof.

I claim:

1. In an internal combustion engine, the combination comprising:
    a pair of stationary housings, each housing having a plurality of adjoining planar sidewalls diverging away from a common apex, adjacent of said sidewalls intersecting one another at equal included angles;
    a compression chamber in each said sidewall at the intersection of said adjacent sidewalls, said compression chambers disposed in equal, radially spaced relation to said apex;
    a plurality of elongated connecting rods mounted in each said housing for rotation about a common axis of rotation through said apex, said shafts disposed at predetermined angles to one another corresponding to said included angle between said sidewalls and each having a vane at an outer free end thereof, the movement of one of said rods parallel to one of said sidewalls causing rotation of said vane on another of said rods into one of said compression chambers;
    a common output shaft extending between said apices of said housings; and
    coupling means between said rods and said output shaft for translating rotational movement of said rods about each said apex into rotation of said output shaft.

2. In an internal combustion engine according to claim 1, said sidewalls of said respective housings diverging away from opposite ends of said output shaft, and said sidewalls being of generally triangular configuration.

3. In an internal combustion engine according to claim 1, each of said compression chambers including ignition means for imparting rotational movement to each said rod about said apex.

4. In an internal combustion engine according to claim 3, including energizing means for firing said ignition means in response to rotation of one of said vanes into said associated compression chamber.

5. In an internal combustion engine according to claim 3, said rods of each housing being oriented with respect to one another whereby rotation of one of said rods about said common apex from one compression chamber to a next compression chamber by said ignition means will cause rotation of said vane associated with the other of said rods through a next successive compression chamber.

6. In an internal combustion engine according to claim 1, the number of said connecting rods being less than the number of said sidewalls in each said housing.

7. In an internal combustion engine, the combination comprising:
- a pair of stationary housings, each said housing having three mutually perpendicular, equi-dimensional planar sidewalls diverging away from a common apex, adjacent of said sidewalls intersecting one another at equal included angles;
- a compression chamber in each said sidewall at the intersection of said adjacent sidewalls disposed in equal, radially spaced relation to said apex, each said chamber having ignition means therein;
- pair of elongated lever arms mounted in each said housing for rotation about a common axis of rotation through said apex, said lever arms disposed at 90° to one another and each said lever arm having a vane at an outer free end thereof, said ignition means imparting movement to one of said lever arms parallel to a sidewall causing rotation of said vane on the other of said lever arms into one of said compression chambers;
- a common output shaft extending between said apices of said housings; and
- flexible coupling means between said lever arms and said output shaft for translating rotational movement of said lever arms about each apex into rotation of said output shaft.

8. In an internal combustion engine according to claim 7, said sidewalls of one of said housings diverging away from said sidewalls of the other of said housings and said sidewalls being of generally triangular configuration.

9. In an internal combustion engine according to claim 7, each of said compression chambers including means for delivering air into said chamber and fuel injection means for injecting fuel into said chamber.

10. In an internal combustion engine according to claim 9, said ignition means being activated in response to rotation of one of said vanes into said associated compression chamber.

11. In an internal combustion engine according to claim 7, said lever arms of each housing being oriented with respect to one another such that rotation of one of said lever arms about said common apex from one compression chamber to a next compression chamber will cause rotation of said vane associated with the other of said lever arms through another of said compression chambers.

* * * * *